Sept. 30, 1958  R. J. CASSIDY  2,854,548
THERMORESPONSIVE SWITCH MEANS
Filed Aug. 3, 1955
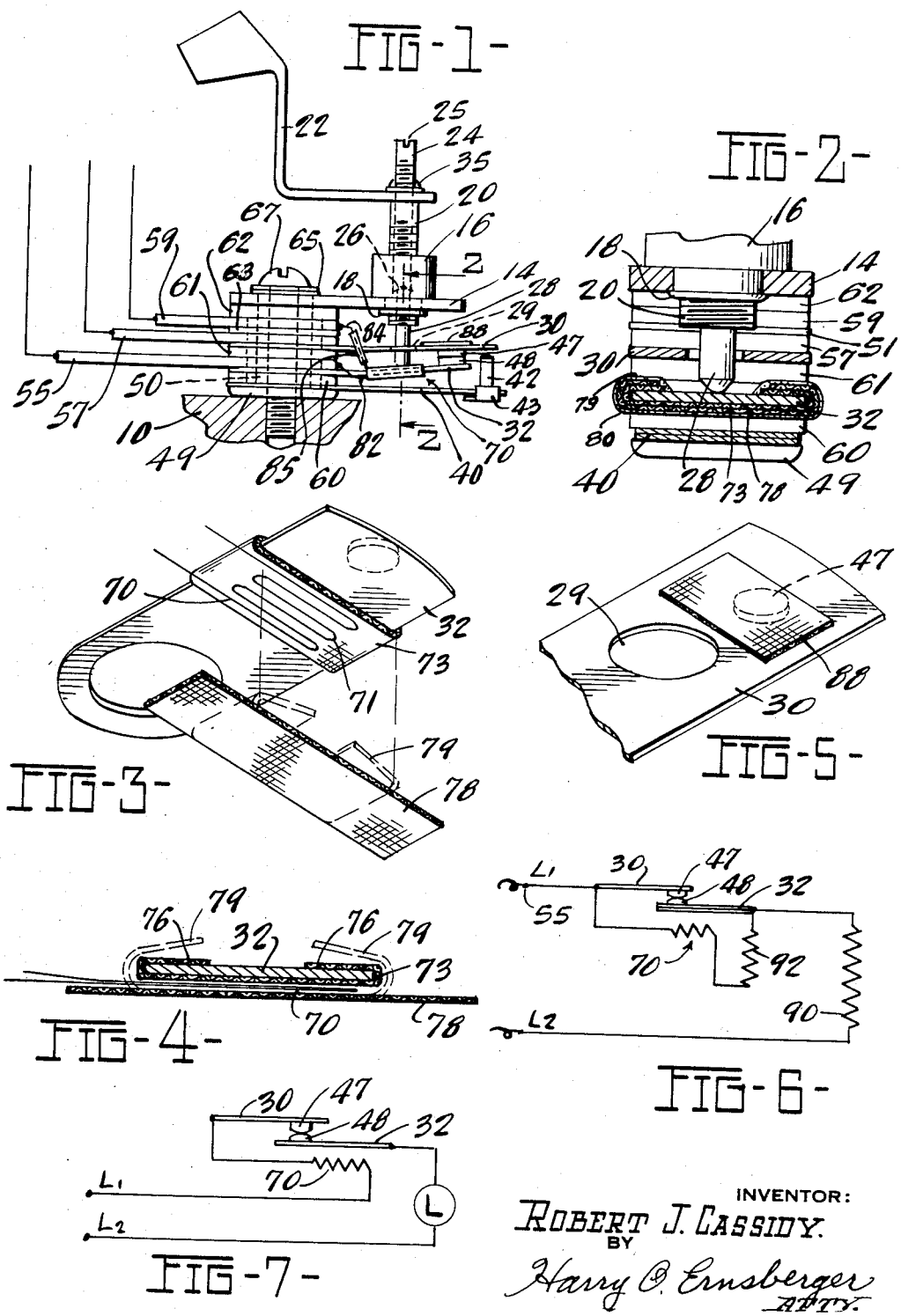
INVENTOR:
ROBERT J. CASSIDY.
BY
Harry O. Ernsberger
ATTY.

United States Patent Office  2,854,548
Patented Sept. 30, 1958

2,854,548

THERMORESPONSIVE SWITCH MEANS

Robert J. Cassidy, Mansfield, Ohio, assignor to Pace, Inc., Mansfield, Ohio, a corporation of Ohio Application August 3, 1955, Serial No. 526,243

14 Claims. (Cl. 200—122)

This invention relates to switch mechanisms and more especially to adjustable switch mechanisms embodying thermoresponsive means for maintaining automatic control of a circuit of an energy consuming appliance.

Switch mechanisms or means embodying thermoresponsive elements for controlling the temperature of heating elements or energy consuming devices of appliances have heretofore been used extensively. In such devices a bimetallic or thermoresponsive element is arranged to actuate a switch arm or contact carrying strip for completing or interrupting an electrical circuit.

Supplemental heating means have been used in conjunction with thermoresponsive or bimetallic elements for accelerating the operation of the thermoresponsive means to reduce the temperature differential of the appliance in circuit with the thermoresponsive means. Supplemental heating means heretofore used for the purpose have been provided in the form of small coils or resistance units suspended adjacent the thermoresponsive of bimetal element, the heat provided by the resistance of the coil to the passage of electrical energy accelerating the action or operation of the thermoresponsive means. Several disadvantages are attendant the use of resistance coils suspended adjacent the thermoresponsive means in that satisfactory mounting means is comparatively costly and such resistance coils must be adequately insulated to avoid short-circuits. Furthermore, it has heretofore been difficult to position a resistance coil adjacent the thermoresponsive element so that satisfactory heat transfer to the thermoresponsive element is attained.

The present invention embraces the provision of a supplemental heating means for accelerating or controlling the operation of a thermoresponsive means wherein the heating means is disposed adjacent the thermoresponsive element and arranged whereby the heat from the supplemental heating means is effective to control the position of the thermostatic element to maintain an accurate control of the temperature of the appliance through operation of the switch means.

An object of the invention resides in the provision of a switch mechanism embodying a thermoresponsive element and a switch arm in juxtaposed relation thereto wherein the switch arm or member supports a supplemental heating means in a manner whereby the heat from the supplemental means is effective to exercise precision control of the circuit of an electrical energy consuming appliance.

Another object of the invention is the provision of a supplemental heating unit for use with a thermoresponsive means wherein the unit is mounted upon a switch arm disposed adjacent the thermoresponsive element and wherein the supplemental heating means is insulated from the switch arm by means unaffected by operating temperatures ambient the thermoresponsive means.

Another object of the invention is the provision of a supplemental heating unit for incorporation in a thermoresponsive switch means wherein the current conducting component of the supplemental heating unit is encased or enclosed in a jacket or cover of vitreous material such as cloth or tape formed of glass fibers or filaments which effectively insulates the heating unit from its supporting means.

Still another object of the invention is the provision of a heating unit comprising a metallic resistance heater carried by a metal member and insulated from the metal member by cloth or tape formed of glass fibers or filaments and the assembly coated with a suitable cement to secure the heating unit and support in assembled relation.

Still another object of the invention is the provision of a method of forming a heating unit and affixing the heating unit to a switch member or other component of a thermoresponsive switch means.

Still another object of the invention is the provision of a supplemental heat accelerator for a thermoresponsive means which may be embodied in a switch mechanism without enlarging the switch means and which may be embodied in a switch at a minimum of expense.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an enlarged side elevational view of a switch construction embodying a form of the invention;

Figure 2 is an enlarged transverse sectional view taken substantially on the line 2—2 of Figure 1;

Figure 3 is an isometric view showing a method of assembling the heating unit construction to a component of the switch unit;

Figure 4 is an enlarged transverse sectional view illustrating the method of securing a heating unit to a support or component of the switch unit;

Figure 5 is an isometric view illustrating an insulating member associated with one of the switch components;

Figure 6 is a schematic circuit diagram of an apparatus illustrating an embodiment of the invention incorporated in the circuit, and Figure 7 is a schematic circuit diagram illustrating the invention utilized as an autocycling timer in a circuit embodying an energy consuming instrumentality.

The arrangement of the invention is illustrated as incorporated in a switch embodying thermoresponsive means for controlling circuits of electrical appliances, as for example, coffee makers, electric irons, and the like, but it is to be understood that the arrangement of the invention may be used in other electrical circuits wherever thermoresponsive control may be deemed desirable or necessary.

Referring to the drawings in detail, Figure 1 illustrates a switch mechanism embodying the invention associated with a portion 10 of an electrical appliance, or for example, a coffee percolator or coffee maker. The switch mechanism shown in Figure 1 is of a type which is both manually and thermoresponsively controlled. The switch as illustrated in Figure 1 is approximately twice the actual size of the construction usable for controlling the circuit of a coffee percolator.

The switch construction is inclusive of a member or plate 14 upon which is supported a hollow sleeve 16, the latter being formed with a tenon portion extending through an opening in the plate 14 and the end of the tenon being swaged as shown at 18. The interior of the sleeve 16 is bored and threaded to accommodate a threaded sleeve-like member 20 to which is secured a manipulating arm 22 providing for manual adjustment of the sleeve 20 and parts associated therewith.

The interior of the sleeve 20 is threaded to accommodate a threaded member or screw 24, the latter having an end zone formed with a cone-shaped recess 26 into which extends the upper end of a pin 28 formed of lava or ceramic material. The ceramic pin 28 extends through an opening 29 in a flexible switch arm or switch member 30 and engages against the upper surface of a second flexible switch arm or switch member 32.

The threaded member 24 is formed with a kerf 25 to receive a suitable tool for adjusting the initial position of the threaded member 24 and ceramic pin 28 relative to the sleeve 20. The threaded member 24 may be cemented as at 35 after initial adjustment has been made to determine the initial relative position of the pin 28. Through this means a range of vertical movement is established for the pin 28, the maximum and minimum limits of movement being thereafter determined by manual rotation of the threaded sleeve 20 through manipulation of the arm 22 between stop or movement limiting means (not shown).

Rotation of the sleeve 20 effects a change in the vertical position of the pin 28 and, as pin 28 bears against the switch member 32, the relative position of the member 32 is thereby attained.

Disposed adjacent the lowermost switch arm 32 is a thermoresponsive means or thermostat in the form of a bimetallic element 40, viz. an element formed of strips of dissimilar metals having different coefficients of expansion and contraction.

The bimetallic element 40, when utilized or intercalated in a circuit of an appliance including a heating means, is disposed adjacent some portion of the appliance where it is influenced by heat generated by resistance to the passage of an electric current through the heating means. The bimetal element or thermoresponsive means 40 is of the type which is arranged to be flexed or distorted under temperature variations and is positioned to influence the position of the switch arm 30 for circuit controlling purposes.

The free end of the bimetallic element 40 is equipped with a button or member 42 formed of ceramic, lava or other heat resistant material secured to the element 40 by means of a clip 43. The upper end of the ceramic member 42 is arranged to engage the switch arm 30 when increased temperatures adjacent the bimetallic element 40 cause the element to be flexed in a direction to engage the button 42 with the switch arm. When a predetermined temperature ambient the bimetallic element 40 is attained, the button 42 engages the switch arm 30 and disconnects the contacts 47 and 48 mounted respectively on the switch arms 30 and 32 interrupting a circuit through the switch arms.

The supporting plate 14, switch arms 30 and 32, and the thermoresponsive means 40 may be assembled in a compact unit as shown in Figure 1. A metal member or disk 49 is formed with an upwardly extending thin walled sleeve 50 adapted to extend through an opening in the frame plate 14.

The switch construction includes a terminal or connector member 55 in electrical contact with switch arm 32, a connector or terminal 57 in electrical contact with switch arm 30 and a terminal or connector 59.

The thin walled sleeve 50 extends through openings in the switch arms 30 and 32, connectors 55, 57 and 59, through insulating members or discs 60, 61 and 62 formed of high temperature resistant insulating material such as ceramic, and through a disc of mica 63. After assembly of these elements, the portion of the sleeve 50 extending above the frame plate 14 is swaged or staked as at 65, thus forming a compact and integrated assembly of the components of the switch mechanism. The assembly may be secured to the portion 10 of an appliance by means of a threaded member or bolt 67 or other suitable fastening means.

The switch construction includes a heating means or unit 70 associated with a component of the switch mechanism and is disposed whereby the heat emanating therefrom influences the thermoresponsive means or bimetallic element 40 to control current flow to or through a current consuming instrumentality in circuit with the switch mechanism. In the embodiment illustrated the supplemental heater or heating means is mounted upon and supported by the switch arm 32 which is adjacent or in juxtaposition with the bimetallic element 40.

The heater arrangement is shown in detail in Figures 2, 3 and 4. The heater or supplemental heating means 70 as illustrated, consists of several coils, turns or loops 71 of comparatively fine resistance wire of the character used for resistance heaters and being of a size and length suitable for producing a predetermined quantity of heat by current flowing through the heater.

In the present invention, the heating coils or loops 71 are insulated from the support by means capable of withstanding the heat generated by the heating element of the electrical appliance and the heat generated by passage of current through the turns or coils 71 of the heater 70.

A member 73 of insulating material is disposed in contact with the switch arm 32 and is formed of textile or textile-like material woven or otherwise formed from vitreous material such as glass fibers or filaments. The member 73 may be fashioned in the form of a glass fiber textile strip or tape, which is provided with a pressure sensitive adhesive on the side of the tape 73 adjacent the switch arm 32.

The tape is of a length relative to the width of the switch arm 32 so that end portions 76 of the tape 73 may be folded into contiguous relation with edge zones or other major surface of switch arm 32 as shown in Figure 4. The pressure sensitive adhesive on the inner surface of the tape 73 establishes a securing means to hold the tape to the switch arm 32 during assembly.

A second strip of tape 78 or textile formed of vitreous material such as glass fibers or filaments is arranged to be disposed contiguous with the tape or strip 73. Disposed between the strips of tape 73 and 78 are the convolutions, turns or loops of wire 71 forming the resistance of heating element 70. During assembly the end zones 79 of tape 78 are folded upon the end zones 76 of the tape 73 to completely encase or enclose the heating element 70. The surface of the tape 78 adjacent the heating element 70 is provided with a thermosetting bonding material such as a silicone binder or a phenol-formaldehyde resin capable of being set or cured by heat.

After the assembly of the heating element 70 and the tapes 73 and 78 with the switch arm or switch component 32, the assembly may be baked or subjected to heat curing at a suitable temperature for example 400° F. to 500° F. to thermally set or cure the bonding material. After the curing operation is completed, a high temperature resistant aluminum paint is applied so as to provide a coating 80 over the exterior surface areas of the tape.

As shown in Figure 1, one end or terminal 82 is bonded to the terminal member or connector 55. The other end or terminal 84 is bonded to a connector or member 59. A sleeve 85 of insulating material surrounds the portion of the wire between the heating unit 70 and the connector 59. A strip 88 of insulating material is secured to the upper surface of the switch arm 30 to avoid engagement of the arm with the plate 14 in the event that the bimetallic element 30 is flexed upwardly to an extent to move the switch arm 30 to an extreme uppermost position.

It should be noted that the turns or coils 71 of the heater 70 are preferably arranged in a single plane or uniplanar formation whereby the heater unit is compact and occupies a minimum of space.

Figure 2 is a diagrammatic illustration of a circuit utilizing the switch mechanism of Figure 1 for controlling the circuit of a coffee maker or percolator embodying a main load or percolating heating coil and auxiliary load or coil for simmer heat. In this arrangement the switch arms 30 and 32 and contacts carried thereby are in series with the main load or heater 90 and the auxiliary load or simmer heater 92 is in series with the coil or auxiliary heater 70 arranged to influence the thermoresponsive means or element 40 (shown in Figure 1) for flexing the switch arm 30. The coil 70 and simmer coil 92 are biased or shunted across the switch contacts 47 and 48.

In operation, the current supply lines L1 and L2 are connected respectively with terminals 55 and one end of the main load or heater 90. As the contacts 47 and 48 are initially in closed position, current flows through the main heating coil or unit 90 of the percolator. The coil 90 is of a character to permit more current flow than the simmer coil 92. For example the coil 90 may be 800 watt unit while the simmer coil 92 may be a 50 watt unit. Thus the major current flow is through the main heating element 90 when the contacts 47 and 48 are closed.

When the heat generated by current flow through coil 90 is sufficient to flex the thermoresponsive or bimetallic element 40, the latter, through the button 42, flexes the switch arm 30 to open or disengage the contacts 47 and 48. Thereafter current flow is established through the thermostat heater 70, simmer coil 92 and main coil 90.

As the thermostat coil 70 is disposed in close relation to the bimetallic element 40, the heat generated by resistance to current flow through the coil 70 influences the element 40 maintaining the same in a flexed condition to hold contact 47 out of engagement with contact 48 whereby the simmer coil 92 is effective to maintain the coffee in the percolator at a predetermined temperature so long as current is supplied through the supply conductors L1 and L2.

The arrangement of the invention may be utilized as an autocycling timer in a circuit wherein it is desired to intermittently energize an energy consuming instrumentality. Figure 7 is illustrative of a circuit of this character wherein the load L may be one or more lamps, a small motor or other current consuming construction.

As shown in Figure 7, the load L is connected in series with contacts 47, 48 and the thermostat heater 70. When current is initially supplied to the circuit from supply lines L1 and L2, contacts 47 and 48 are closed and current flow is established through the thermostat heater 70 and the load L to energize the latter. Current flow through the resistance heater 70 generates heat which influences the bimetallic element 40 (shown in Figure 1) flexing the element 40 to actuate switch arm 30 and open or disengage the contacts 47 and 48 interrupting current flow through the load L and the heater 70.

The heater 70 cools off and the bimetallic element 40 is correspondingly cooled and returns or is flexed toward its initial position. When it is flexed to a position wherein contact 47 on switch arm 30 reengages contact 48 the circuit is again completed and load L and thermostat heater 70 are energized. The automatic cycling continues as long as current is supplied to the circuit from lines L1 and L2. The duration of current flow through the load may be adjusted within limits by rotating the screw 24 by the manipulating arm 22 to adjust the relative position of the switch arm 32.

While Figures 6 and 7 are illustrative examples of use of the invention, it is to be understood that the arrangement may be used to control circuits incorporating other current consuming elements or instrumentalities where thermoresponsive means may be advantageously utilized.

It is apparent that, within the scope of the invention, modifications and different arrangements may be made other than is herein disclosed, and the present disclosure is illustrative merely, the invention comprehending all variations thereof.

I claim:

1. Apparatus of the character disclosed, in combination, switch means having relatively movable current-conducting members, a thermoresponsive means, said thermoresponsive means being arranged to control the relative position of one of said current conducting members upon variations in temperature adjacent the thermoresponsive means, an electrically energizable heating means carried by the other of said members whereby the heat therefrom influences the thermoresponsive means, said heating means being surrounded by textile formed of filaments of mineral material.

2. Apparatus of the character disclosed, in combination, switch means having relatively movable current-conducting plates, a thermoresponsive means being arranged to actuate one of said current conducting plates upon variations in temperature adjacent the thermoresponsive means, an electrically energizable heating means arranged whereby the heat therefrom influences the thermoresponsive means, said heating means having turns of resistance wire formed in planar configuration disposed adjacent one side of one of said plates, said turns of wire being disposed between layers of filaments of glass.

3. Apparatus of the character disclosed, in combination, switch means having a relatively movable current-conducting member, a thermoresponsive means, said thermoresponsive means being arranged to control the relative position of said current conducting member upon variations in temperature adjacent the thermoresponsive means, an electrically energizable heating means disposed at the side of the member adjacent the thermoresponsive means whereby the heat therefrom influences the thermoresponsive means, said heating means being enclosed by textile formed of filaments of glass.

4. Apparatus of the character disclosed, in combination, switch means having relatively movable current-conducting members, a thermoresponsive means, said thermoresponsive means being arranged to actuate one of said current conducting members upon variations in temperature adjacent the thermoresponsive means, an electrically energizable heating means including a plurality of turns of resistance wire disposed substantially in a single plane disposed at the side of the member adjacent the thermoresponsive means, textile formed of glass filaments enclosing the turns of wire, and a coating of bonding material on said textile.

5. Apparatus of the character disclosed, in combination, switch means having relatively movable current-conducting switch members, a thermoresponsive means, said thermoresponsive means being arranged to actuate one of said current conducting members upon variations in temperature adjacent the thermoresponsive means, an electrically energizable heating means supported upon one of said current-conducting switch members adjacent one side thereof, and a textile formed of glass filaments enclosing the heating means.

6. Apparatus of the character disclosed, in combination, switch means having relatively movable current-conducting members, a thermoresponsive means, said thermoresponsive means being arranged to actuate one of said current conducting members upon variation in temperature adjacent the thermoresponsive means, an electrically energizable heating means carried by one of the members, textile material formed of filaments of vitreous material disposed on each side of the heating means, said textile material embracing a portion of the current conducting member carrying the heating means, and a bonding resin securing the textile to the current conducting member.

7. Apparatus of the character disclosed, in combination, switch means having relatively movable current-conducting members, a thermoresponsive means, said thermoresponsive means being arranged to actuate one of said current conducting members upon variation in temperature adjacent the thermoresponsive means, an electrically energizable heating means, said heating means including a plurality of turns of resistance wire arranged substantially in a single plane and disposed adjacent one major surface of one of the members, textile material formed of glass filaments disposed on each side of the heating means, said textile material embracing the heating means and a portion of the adjacent current conducting member, and a resin securing the textile and heating means to the adjacent current-conducting member.

8. In combination, a flexible switch plate, an electrically energizable heating means disposed adjacent one major surface of the switch plate, an enclosure for the heating means formed of glass filaments, and a bonding resin for securing the enclosure to the switch member.

9. In combination, a flexible switch plate, an electrically energizable heating means, said heating means being mounted at one side of the switch plate, means for insulating the heating means from the switch plate including a strip of textile material formed of glass filaments disposed between the heating means and the plate, and a second strip of textile material surrounding the heating means and a portion of the switch member.

10. In combination, a flexible switch plate, an electrically energizable heating means, said heating means being mounted on the switch plate adjacent one major surface thereof, means for insulating the heating means from the switch member including a layer of textile material formed of glass filaments and enclosing the heating means, and a bonding resin for securing the textile material to the switch plate.

11. In combination, switch means including relatively movable current conducting members, said members having contact means for establishing a circuit through the current-conducting members, a bimetallic element, said bimetallic element being arranged to control the relative position of one of said members, an electrically energizable heating means for influencing the bimetallic element, an insulating means formed of glass filaments in engagement with one of said members, said insulating means supporting the heating means, and a bonding resin securing the assembly of heating means and insulating means to the said member.

12. In combination, switch means including relatively movable current conducting switch members, said members having contact means for establishing a circuit through the current-conducting members, a bimetallic element, means for manually adjusting the relative position of one of said members, said bimetallic element being arranged to control the relative position of the other of said members, an electrically energizable heating means for influencing the bimetallic element, a textile material formed of glass filaments in engagement with one of said members, said textile material insulatingly supporting the heating means at one side of the adjacent switch member, and a bonding resin securing the assembly of heating means and textile material to the said member.

13. In combination with a switch means having relatively movable switch arms and a thermoresponsive means for controlling the position of one of the switch arms, an electrically energizable heating means for influencing the thermoresponsive means, said heating means being supported upon and at one side of one of said switch arms, said heating means including a plurality of turns of resistance wire arranged substantially in a single plane, an enclosure of heat resistant insulating material for the heating means, and a heat cured bonding resin securing the heating means and insulating material in assembled relation with the supporting switch arm.

14. In combination with a switch means having relatively movable switch arms and a thermoresponsive means for controlling the position of one of the switch arms, an electrically energizable heating means for influencing the thermoresponsive means, said heating means being supported upon the other of said switch arms, said heating means including a plurality of turns of resistance wire arranged substantially in a single plane and supported at the side of one of the switch arms and adjacent the thermoresponsive means, an enclosure for the turns of wire formed of glass filaments, said enclosure embracing a portion of the switch arm supporting the heating means, and a heat cured silicone bonding material coating said enclosure and securing the heating means and enclosure in assembled relation with the supporting switch arm.

References Cited in the file of this patent

UNITED STATES PATENTS

| | | |
|---|---|---|
| 1,621,023 | Newell | Mar. 15, 1927 |
| 2,158,711 | Weber | May 16, 1939 |
| 2,409,420 | Clark | Oct. 15, 1946 |
| 2,586,309 | Dales | Feb. 19, 1952 |
| 2,590,041 | Roost | Mar. 18, 1952 |
| 2,710,909 | Logan et al. | June 14, 1955 |
| 2,728,842 | Turner | Dec. 27, 1955 |
| 2,762,885 | Foster | Sept. 11, 1956 |